(No Model.)
W. L. LONG.
DOUBLE TREE.
No. 313,433. Patented Mar. 3, 1885.
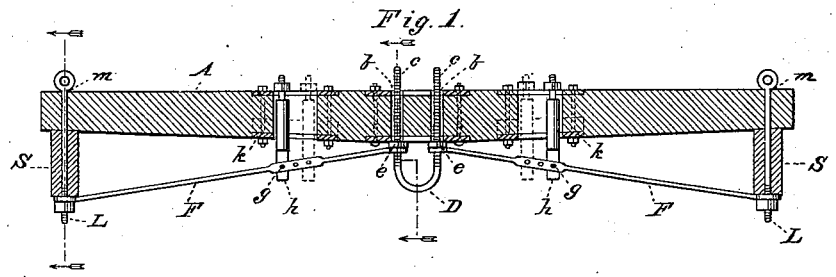
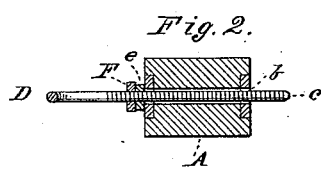
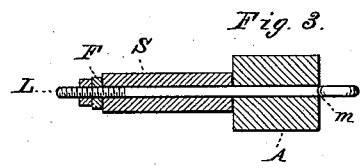
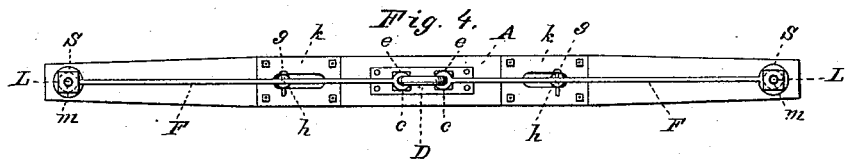
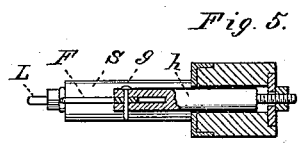
WITNESSES
Villette Anderson.
Grace M. Craig.
INVENTOR
Walter L. Long,
by Anderson & Smith
his ATTORNEYS
N. PETERS, Photo-Lithographer, Washington, D. C.

UNITED STATES PATENT OFFICE.

WALTER LEE LONG, OF MELROSE, VIRGINIA.

DOUBLE-TREE.

SPECIFICATION forming part of Letters Patent No. 313,433, dated March 3, 1885.

Application filed December 10, 1884. (No model.)

*To all whom it may concern:*

Be it known that I, WALTER L. LONG, a citizen of the United States, residing at Melrose, in the county of Rockingham and State of Virginia, have invented certain new and useful Improvements in Double-Trees; and I do declare the following to be a full, clear, and exact description of the invention, such as will enable others skilled in the art to which it appertains to make and use the same, reference being had to the accompanying drawings, and to letters or figures of reference marked thereon, which form a part of this specification.
Figure 1 of the drawings is a horizontal section. Figs. 2, 3, and 5 are detail views. Fig. 4 is a back view.

This invention has relation to spring double-trees for use in connection with plows and farm-wagons; and it consists in the construction and novel arrangement of devices, as hereinafter set forth, and pointed out in the appended claim.

In the accompanying drawings, the letter A designates the main body of the double-tree, which is constructed of wood, and is usually provided with iron plates, which are bolted thereto, rendering it very strong.

At the central portion of the body piece or bar A are made sockets $b\ b$, which receive the arms $c\ c$ of the staple shaped loop D, said arms bearing nuts $e\ e$ and moving in said sockets under the action of the draft. To the arms $c\ c$, respectively, are connected the levers F F, which are pivoted at $g\ g$ to fulcrum-bolts $h\ h$, which extend through the plates $k\ k$ and through the body-bar A. These fulcrum-bolts are adjustable toward or from the center of the bar A, suitable perforations being made through this bar for the purpose of such adjustment.

To the rear ends of the levers F are connected the single-tree hitch-bolts L, which pass through perforations $m$ in the ends of the main double-tree bar A. Around each hitch-bolt L, and between the bar A and the lever F, is placed a spring, S, which is compressed by the draft, allowing the hitch-bolt to move forward a little. At the same time the hitch-loop D, by means of the nuts $e\ e$, engages the inner arms of the levers F F and operates said levers to compress the spring S. These levers F also have some elasticity, and their action, combined with that of the springs S and the hitch devices, is designed to relieve the draft from sudden shocks or jerks, so that the animals are brought to work easily and without the injury which arises from positive draft-connections on harsh soil or uneven ground. When the work is unusually heavy, the lever-fulcrums are adjusted nearer to the hitch-loop, so as to lessen the power of the plow over the levers and increase the action of the outer arms of said levers.

Having described this invention, what I claim, and desire to secure by Letters Patent, is—

The spring double-tree having the movable central loop-hitch engaging the inner ends of adjustable levers, the single-tree hitch-bolts connected to the outer ends of said levers and working through perforations in the main bar, and the springs S on the hitch-bolts between said main bar and said levers, substantially as specified.

In testimony whereof I affix my signature in presence of two witnesses.

WALTER LEE LONG.

Witnesses:
  JNO. L. LOGAN,
  D. H. LEE MARTZ.